United States Patent
Iwamura

(10) Patent No.: US 9,434,214 B2
(45) Date of Patent: Sep. 6, 2016

(54) PNEUMATIC TIRE WITH TREAD HAVING THREE DIMENSIONAL SIPES

(71) Applicant: SUMITOMO RUBBER INDUSTRIES, LTD., Kobe-shi, Hyogo (JP)

(72) Inventor: Wako Iwamura, Kobe (JP)

(73) Assignee: SUMITOMO RUBBER INDUSTRIES, LTD., Kobe-Shi (JP)

(*) Notice: Subject to any disclaimer, the term of this patent is extended or adjusted under 35 U.S.C. 154(b) by 509 days.

(21) Appl. No.: 13/963,163

(22) Filed: Aug. 9, 2013

(65) Prior Publication Data
US 2014/0261936 A1 Sep. 18, 2014

(30) Foreign Application Priority Data
Mar. 15, 2013 (JP) ................................. 2013-053723

(51) Int. Cl.
*B60C 11/12* (2006.01)

(52) U.S. Cl.
CPC .... *B60C 11/1218* (2013.04); *B60C 2011/1213* (2013.04)

(58) Field of Classification Search
CPC .................. B60C 11/1218; B60C 2011/1213
See application file for complete search history.

(56) References Cited

U.S. PATENT DOCUMENTS

| | | | | |
|---|---|---|---|---|
| 5,783,002 A | * | 7/1998 | Lagnier ................... | B60C 11/12 152/209.1 |
| 2004/0134579 A1 | | 7/2004 | Tanaka | |
| 2005/0150581 A1 | | 7/2005 | Kishida | |
| 2007/0199634 A1 | * | 8/2007 | Sakamaki ............... | B60C 11/11 152/209.23 |
| 2013/0153106 A1 | * | 6/2013 | Clemmer ............ | B60C 11/1218 152/209.23 |

FOREIGN PATENT DOCUMENTS

| JP | 04-306106 A | * | 10/1992 |
|---|---|---|---|
| JP | 09-142110 A | * | 6/1997 |
| JP | 2001-001722 A | * | 1/2001 |
| JP | 2004-203128 A | | 7/2004 |
| JP | 2005-041393 A | * | 2/2005 |
| JP | 2005-170308 A | * | 6/2005 |
| JP | 2005-193867 A | | 7/2005 |

OTHER PUBLICATIONS

Machine translation for Japan 2005-170308 (no date).*
Machine translation for Japan 2005-041393 (no date).*
Machine translation for Japan 2001-001722 (no date).*
Machine translation for Japan 09-142110 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire comprises a tread block having a top face provided with a three-dimensional sipe, the sipe extending along its longitudinal direction with an angle of 0 to 45 degrees with respect to a tire axial direction, the sipe having a first opening configuration extending in a wavy manner with amplitude W and a cycle a1 in a cross sectional view of the block parallel to the top face, the sipe having a second opening configuration extending in a wavy manner with amplitude W and a cycle a2 in a cross sectional view of the block perpendicular to the longitudinal direction of the sipe, and the sipe satisfying the following relation (1) in a rectangular coordinate system in which the x-axis corresponds to the longitudinal direction, the z-axis corresponds to a depth direction of the sipe:

$y = W \cdot \sin\{(2\pi \cdot x/a1) + (2\pi \cdot z/a2) + \theta\}$.

3 Claims, 4 Drawing Sheets

PNEUMATIC TIRE WITH TREAD HAVING THREE DIMENSIONAL SIPES

BACKGROUND OF THE INVENTION

1. Field of the Invention

The present invention relates to a pneumatic tire, more particularly to a studless or snow tire having a tread block provided with a sipe for snowy and icy roads.

2. Description of the Related Art

Typically, a pneumatic tire designed for use on icy and snowy roads has a plurality of tread blocks each of which is provided with a plurality of sipes in order to improve traction force against icy or snowy road by increasing biting edges of sipes. However, the tread block having high sipe density gives large deformation thereon when it comes into contact with the road due to low block stiffness, whereby it would be difficult to effectively get much traction force on icy road.

In order to reduce the amount of deformation of the tread block, Japanese patent application laid-open Nos. 2004-203128 and 2005-193867 disclose a sipe "A", which is called as Miura-ori shaped sipe, shown in FIG. 4.

In a cross sectional view of the tread block being parallel to the top face S, the sipe "A" extends along its longitudinal direction in a zigzag manner. In another cross sectional view of the tread block being perpendicular to the longitudinal direction of the sipe, the sipe "A" also extends along its depth direction in a zigzag manner. The sipe "A" provides the tread block with a pair of facing sipe walls B that have a three dimensional unevenness surface comprising a plurality of inclined parallelogram planes. The sipe walls B engage each other when the tread block come into contact with the road so that the amount of deformation of the tread block mentioned above is reduced.

Since the Miura-ori shaped sipe is defined using a lot of complicated parameters such as zigzag pitches, zigzag amplitude, a combination of the mountain fold A1 and the valley fold A2, intersection angle between two parallelogram surfaces, or the like, it is very difficult to design the Miura-ori shaped sipe with three dimensional unevenness surfaces into the tread block. Accordingly, the conventional studless tires with the same tread patterns had the same Miura-ori shaped sipes for saving these design cost in spite of having different tire sizes.

However, in order to effectively minimize deformation of the tread block having the Miura-ori shaped sipe or the like, parameters for defining the shape of the sipe should be designed according to the tire sizes or the tread block sizes.

In view of above, the inventor has found an improved sipe having three dimensional unevenness surfaces that are easy to design and tightly engage each other for effectively minimizing deformation of the tread block. Such an improved sipe may be modified easily according to each tread block size or shape in a tread portion of a tire while minimizing deformation of the tread block, for example.

SUMMARY OF THE INVENTION

The present invention has been made in light of such circumstance described above. A main object of the present invention is to provide a pneumatic tire having an improved sipe that is easy to design and offers minimized deformation of the tread block while maintaining increased traction on snowy and icy roads and wear resistance of the tread block.

According to one aspect of the present invention, there is provided A pneumatic tire comprising a tread portion having at least one block, said at least one block having a top face provided with a three-dimensional sipe, said three-dimensional sipe extending along its longitudinal direction having an angle $\alpha$ in a range of from 0 to 45 degrees with respect to an axial direction of the tire, said three dimensional sipe having a first opening configuration that extends in a wavy manner having amplitude W and a cycle $a1$ in a cross sectional view of said block being parallel to the top face, said three dimensional sipe having a second opening configuration that extends in a wavy manner having amplitude W and a cycle $a2$ in a cross sectional view of said block being perpendicular to the longitudinal direction of said three dimensional sipe, and said three dimensional sipe satisfying the following relation in a rectangular coordinate system of x, y, z axes in which the x-axis corresponds to the longitudinal direction of said three dimensional sipe, the z-axis corresponds to a depth direction of said three-dimensional sipe, and the y-axis is perpendicular to the x and y axes:

$$y = W \cdot \sin\{(2\pi \cdot x/a1) + (2\pi \cdot z/a2) + \theta\}.$$

Preferably, the cycle $a1$ of the first opening configuration of said three dimensional sipe is in a range of from 14% to 90% of a length BL of said block measured along the x-axis.

Preferably, the cycle $a2$ of the second opening configuration of said three dimensional sipe is in a range of from 14% to 90% of a height BH of said block measured along the z-axis.

Preferably, said tread portion comprises a plurality of blocks, said blocks comprise a first block provided with a first three dimensional sipe and the second block provided with a second three dimensional sipe, wherein the first and second three dimensional sipes differ from at least one of the cycle $a1$, the cycle $a2$, and amplitude W.

Preferably, said first block has a maximum axial block width in said plurality of blocks, said second block has a minimum axial block width in said plurality of blocks, and the first three dimensional sipe of the first block has the cycle $a2$ larger than the cycle $a2$ of the second three dimensional sipe of the second block.

DESCRIPTION OF THE PREFERRED EMBODIMENTS

One embodiment of the present invention will be described below with reference to the drawings.

Figure 1:
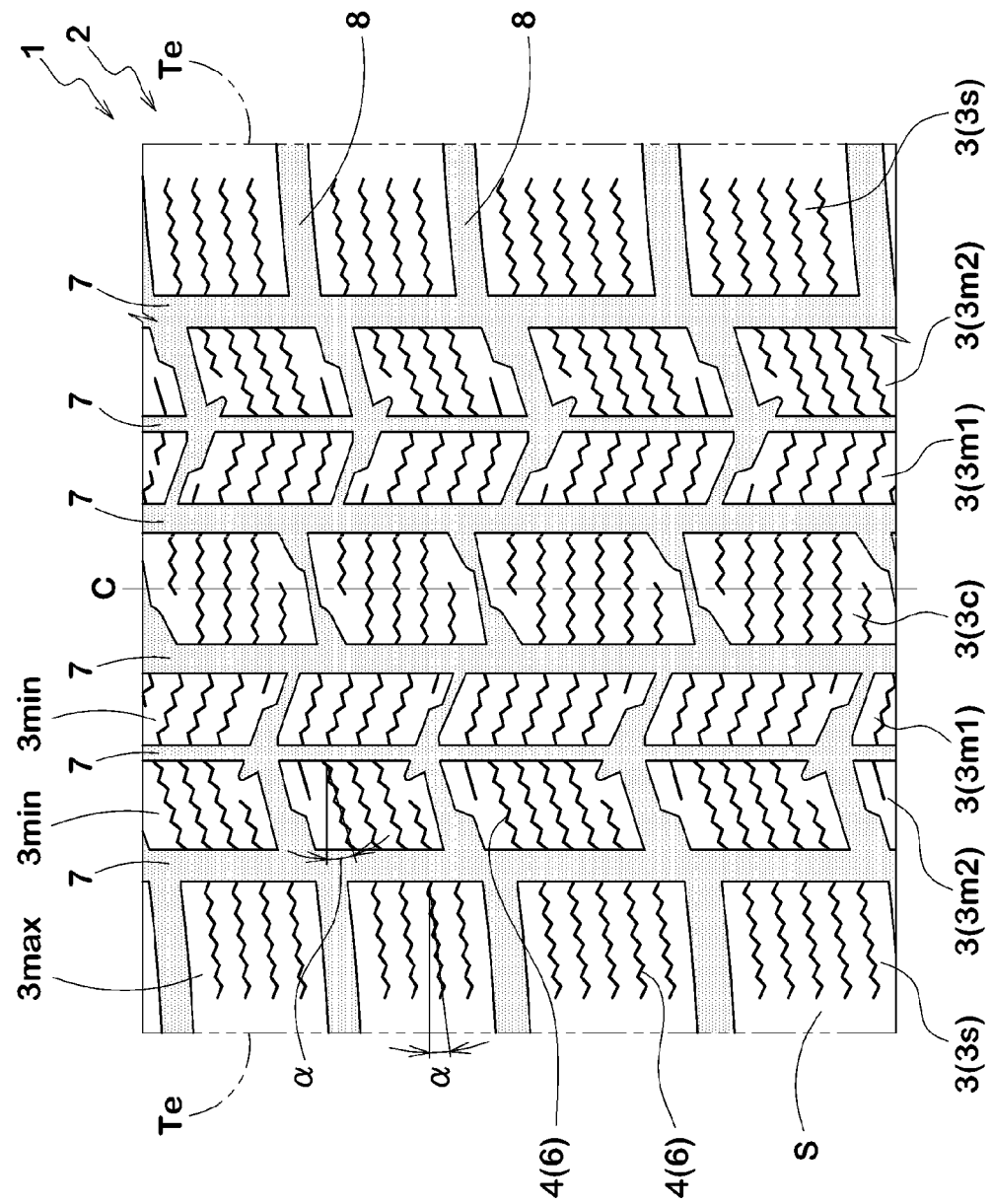
FIG. 1 is a development view of a tread portion of a pneumatic tire in accordance with the present embodiment of the invention.

FIG. 1 is a development view of a tread portion 2 of a pneumatic tire 1 in accordance with the present embodiment of the invention. Referring to FIG. 1, the tire 1 has the tread portion 2 provided with a plurality of blocks 3 each having a top face S provided with a three-dimensional sipe 4.

The tread portion 2 is provided with a plurality of circumferentially extending longitudinal grooves 7 to form a plurality of land portions between tread edges Te, Te, and a plurality of lateral grooves 8 traversing each land portion to form a plurality of blocks 3.

In this embodiment, land portions on the tread portion 2 comprise a center block row including a plurality of center blocks 3c arranged in a tire equator C, a pair of first middle block rows each including a plurality of first middle blocks 3m1 disposed axially both sides of the center blocks 3c, a pair of second middle block rows each including a plurality of second middle blocks 3m2 disposed axially outward of the first middle blocks 3m1, and a pair of shoulder block rows each including a plurality of shoulder blocks 3s disposed axially outward of the second middle blocks 3m2. However, the tread pattern is not particularly limited to the embodiment mentioned above. For example, the tread portion 2 may consist of four, five or six block rows. Additionally, the tread portion 2 may include at least one continuously extending rib.

In this embodiment, each top face S of blocks 3 is provided with at least one sipe 4 that includes at least one three-dimensional sipe 6. The three-dimensional sipe 6 extends along its longitudinal direction having an angle $\alpha$ in a range of from 0 to 45 degrees with respect to an axial direction of the tire. In case that the angle $\alpha$ is more than 45 degrees, the biting edge effect of the sipe 6 against the circumferential direction of the tire may be decreased. The angle $\alpha$ of the sipe 6 may differ in each block row within the range of from 0 to 45 degrees, respectively.

Figure 3:
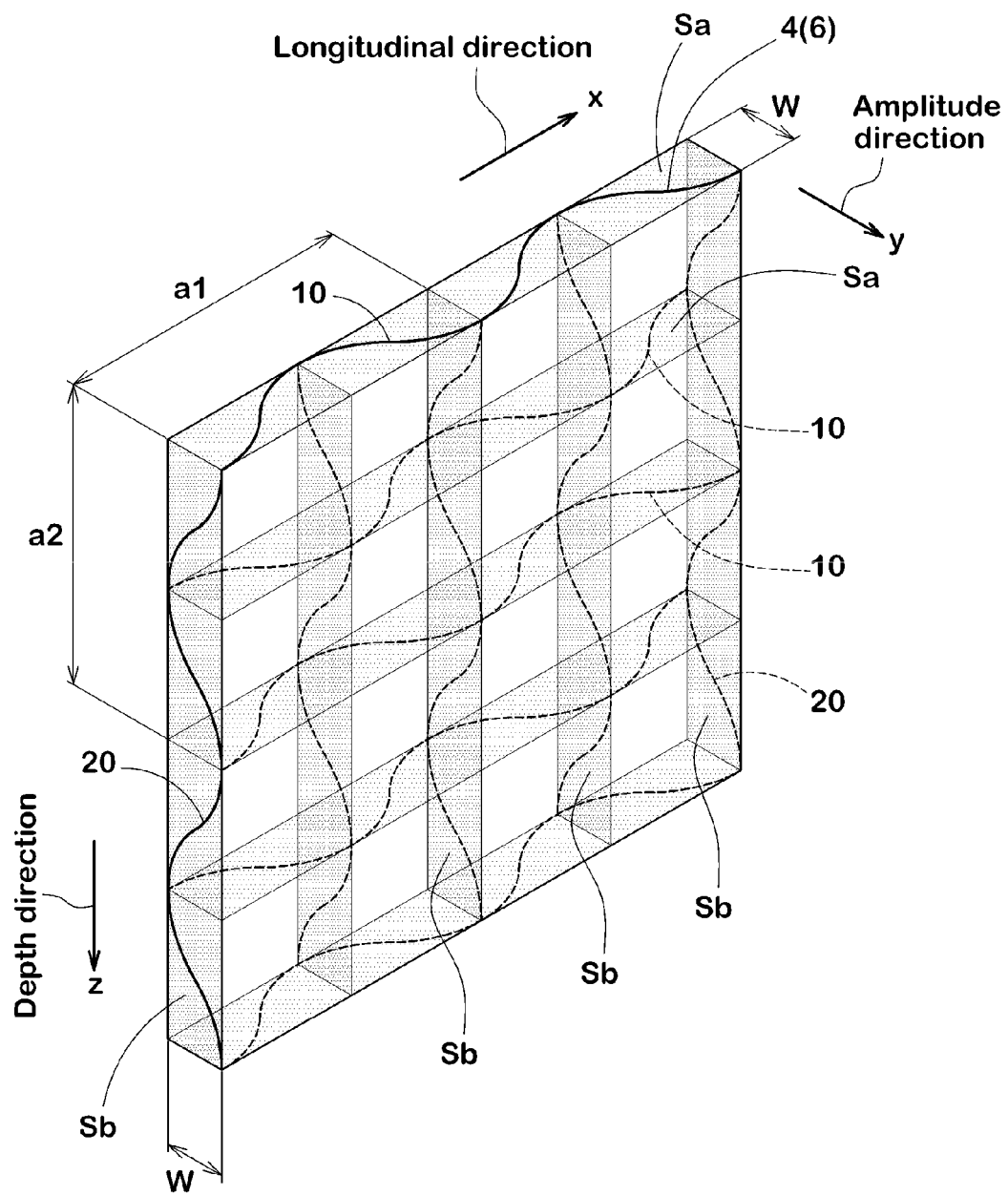
FIG. 3 is a perspective view of a three dimensional sipe of the present embodiment.

Referring to FIG. 3, the three dimensional sipe 6 has a first opening configuration 10 that extends in a wavy manner having amplitude W and a cycle a1 in a cross sectional view Sa of the block being parallel to the top face S. Additionally, the three dimensional sipe has a second opening configuration 20 that extends in a wavy manner having amplitude W and a cycle a2 in a cross sectional view Sb of the block being perpendicular to the longitudinal direction of the three-dimensional sipe 6.

The three dimensional sipe 6 satisfies the following relation (1) in a rectangular coordinate system of x, y, z axes in which the x-axis corresponds to the longitudinal direction of the three dimensional sipe 6, the z-axis corresponds to a depth direction of the three dimensional sipe 6, and the y-axis is perpendicular to the x and y axes which corresponds to amplitude direction of the sipe:

$$y = W \cdot \sin\{(2\pi \cdot x/a1) + (2\pi \cdot z/a2) + \theta\} \quad (1).$$

Namely, the three dimensional sipe 6 provides the block 3 with a pair of smoothly unevenness sipe surfaces that are logically and simply defined using a trigonometric function so that the first and second opening configurations extend in sine curves along with its longitudinal direction (x-axis) and its depth direction (z-axis). For example, a point having a coordinates (x, y, z) on the unevenness sipe surface may be simply defined using the relation (1).

Since these facing unevenness sipe surfaces may engage each other to maintain the block rigidity when the block 3 comes into contact with the road, deformation of the block 3 along its longitudinal (x-axis) and depth (z-axis) directions is minimized.

The three dimensional sipe 6 or a blade for molding thereof is easy to be designed and manufactured using a numerical control machining in which the relation (1) mentioned above is previously stored, for example. Additionally, the three dimensional sipe 6 may be defined using only simply three parameters that contain cycles a1, a2 and amplitude W of the opening configurations 10, 20. Therefore, the three dimensional sipe 6 is easy to modified its opening configuration and size according to requirement such as a block size while offering high design efficiency.

The following relation (2) may also define a three dimensional sipe that has the first and second opening configurations extending in sine curves along with its longitudinal direction (x-axis) and its depth direction (z-axis):

$$y = W \cdot \{\sin(2\pi \cdot x/a1) + \sin(2\pi \cdot z/a2) + \theta\} \quad (2).$$

However, the relation (2) produces a complicated three dimensional sipe that has an irregularly large amplitude. Therefore, when the sipe defined using the relation (2) is molded by a blade, it may be difficult to pull the blade out from the block, whereby rubber around the sipe is broke away from the block.

Here, in case that the number of waves included in the first opening configuration of the three dimensional sipe 6 is not more than one, increased traction on icy roads may not be obtained from the sipe 6. Accordingly, the cycle a1 of the first opening configuration 10 of the three dimensional sipe 6 is preferably in a range of not more than 90% of a length BL of the block 3 measured along the x-axis. On the other hand, the cycle a1 of the first opening configuration 10 of the three dimensional sipe 6 is preferably in a range of not less than 14% of the length BL of the block 3 in order to maintain engaging effect of sipe surfaces as well as edge effect of the sipe. The cycle a1 is sill further preferably in a range of from 20% to 60% the length BL of the block 3.

In case that the number of waves included in the second opening configuration 20 of the three dimensional sipe 6 is not more than one, it may be difficult to reduce deformation of the block 3 during traveling on dry road, whereby steering stability and wear resistance tend to deteriorate. Accordingly, the cycle a2 of the second opening configuration of the three dimensional sipe 6 is preferably in a range of not more than 90% of a height BH of the block 3 measured along the z-axis. On the other hand, the cycle a2 of the second opening configuration of the three dimensional sipe 6 is preferably in a range of not less than 14% of the height BH of the block 3 in order to maintain engaging effect of sipe surfaces as well as edge effect of the sipe. The cycle a2 is sill further preferably in a range of from 20% to 60% the height BH of the block 3.

In this embodiment, each block 3 is provided with a plurality of three dimensional sipes that are arranged in parallel each other and have the same wavy phase with respect to the longitudinal direction of the sipe 6. Thus, rubber portion G between three dimensional sipes 6, 6 has uniform thickness along the longitudinal direction (x-axis) as well as the depth direction (z-axis) of the sipe 6, in order to prevent damage thereon when the blade for molding the sipe is pulled from the block 3.

Figure 2:
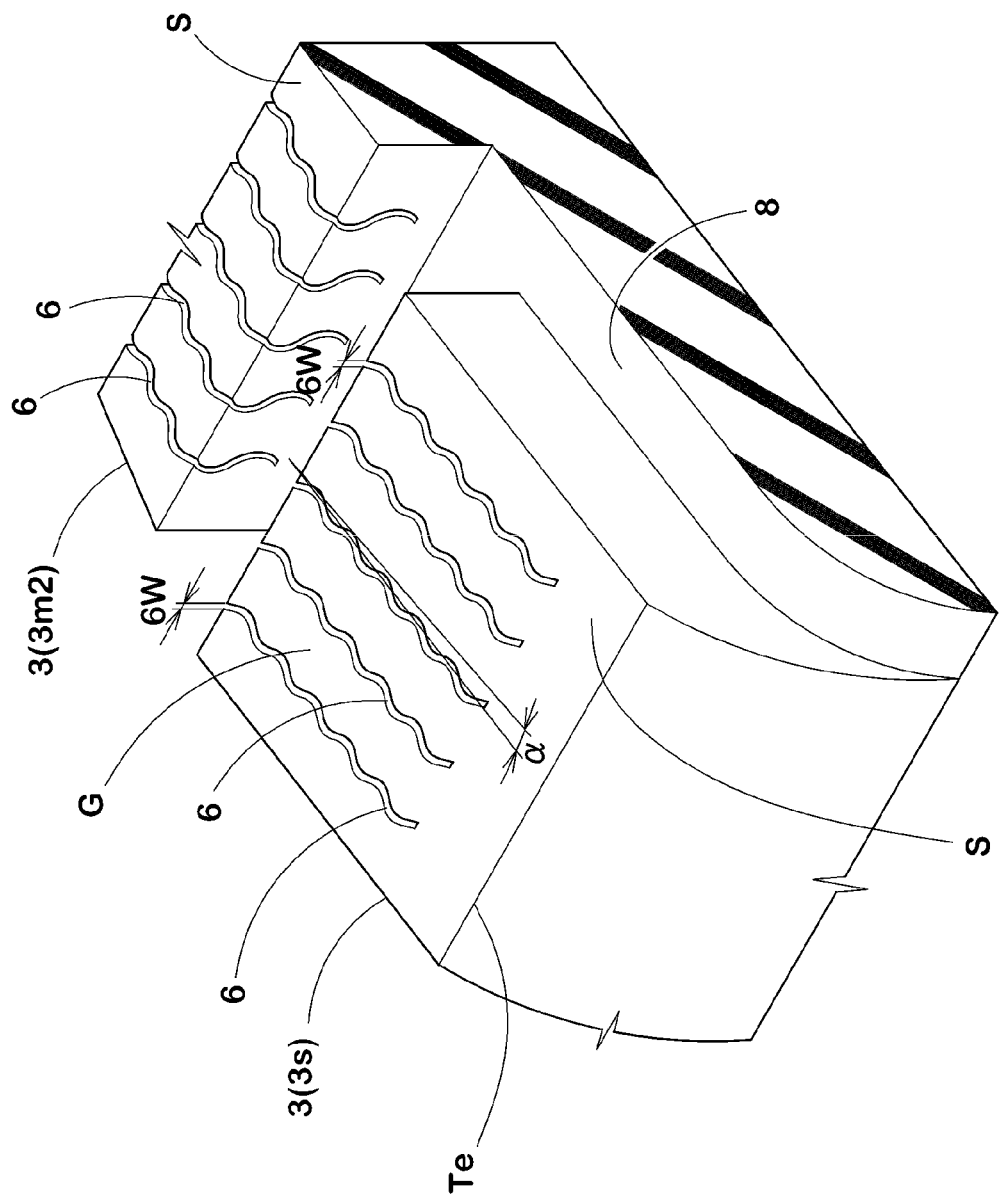
FIG. 2 is an enlarged perspective view showing a block of the tread portion.

The width 6W of the three dimensional sipe 6 shown in FIG. 2 is preferably in a range of from 0.2 to 1.2 mm in order to maintain durability of blades for molding the sipe 6 while minimizing deformation of the block 3 by offering effective engagement of facing sipe walls during traveling.

In order to further minimize deformation of blocks 3, it is preferable to modify the three dimensional shape of the sipe 6 according to the block size or shape. In the present embodiment, the tread portion 2 comprises a plurality of blocks 3 comprising at least one first block $3_{max}$ having a first three dimensional sipe and at least one second block $3_{min}$ having a second three dimensional sipe. In this embodiment, the first block $3_{max}$ corresponds to the shoulder block 3s having the maximum axial block width in the tread portion 2, and the second block $3_{min}$ corresponds to the middle blocks 3m1, 3m2 each having the minimum axial block width in the tread portion 2, wherein the first and second three dimensional sipes differ from each other.

The first and second three dimensional sipes differ from each other with respect to at least one of the cycle a1, the cycle a2 and amplitude W. Since the cycle a1 and amplitude W are parameters that define the first opening configuration 10 of the sipe 6 on the top face S of the block 3, these parameters have a significant impact to the edge effect of the sipe 6 and a tire appearance. Accordingly, the first three dimensional sipe and the second three dimensional sipe have the same cycle a1 and amplitude w, but the different cycle a2. Thus, deformation difference between the first block $3_{max}$ and the second block $3_{min}$ tends to minimize, whereby running performance on icy and snowy roads may be further improved. Preferably, the first three dimensional sipe of the first block $3_{max}$ has the cycle a2 larger than the cycle a2 of the second three dimensional sipe of the second block $3_{min}$.

The block 3 may have at least one three dimensional sipe 6 having at least one its end that terminates within the block 3. The block 3 may also be provided with at least one so-called two dimensional sipe that extends in zigzag or wave manner along its longitudinal direction, but straightly extends in the depth direction of the sipe, or at least one so-called one dimensional sipe consisting a flat plane.

As in the foregoing, a preferred embodiment of the present invention is described above. However, the present invention is not limited to the illustrated embodiment, and can be modified and carried out in various manners.

Figure 4:
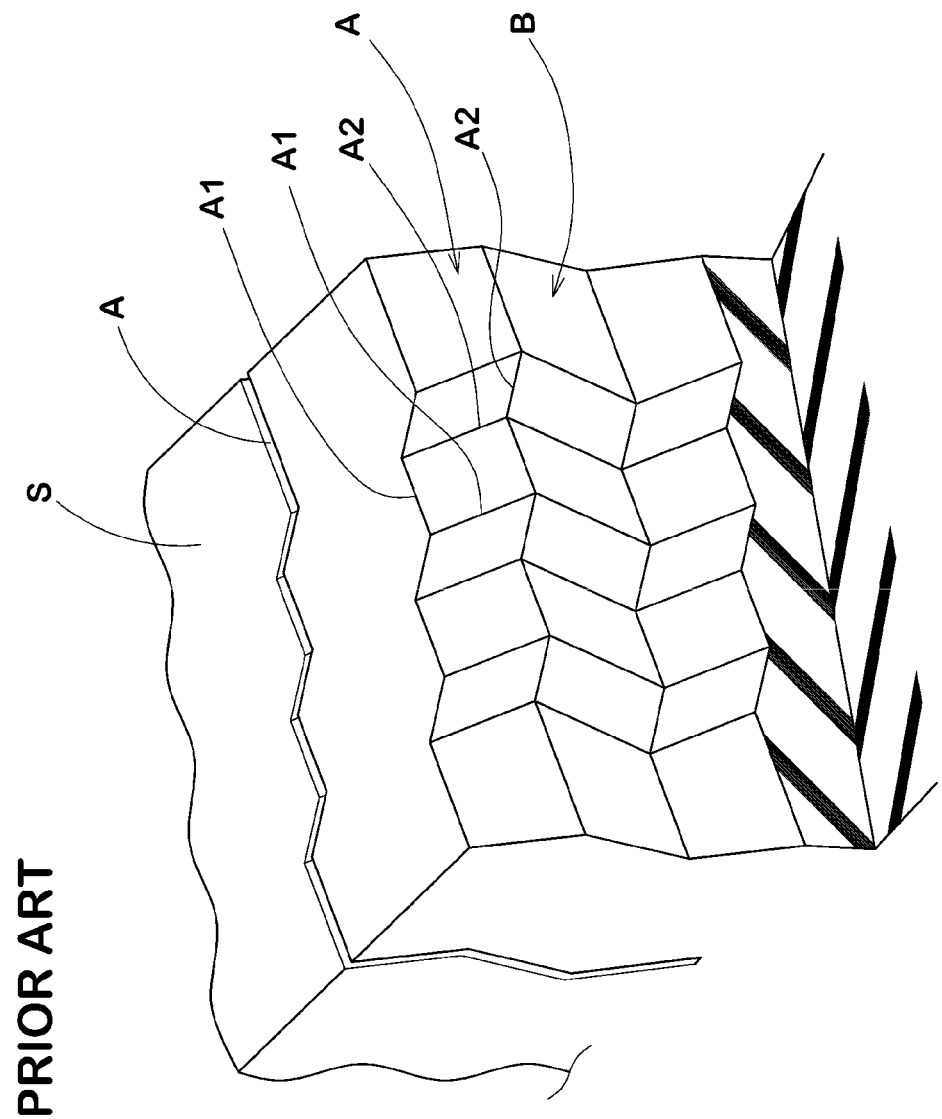
FIG. 4 is a conventional three dimensional sipe.

Comparative Test:

In order to confirm the advantage of the present invention, studless tires for a passenger vehicle of 195/65R15 having the tread pattern showing FIG. 1 were manufactured based on Table 1, and then running performance on icy, snowy and dry roads, uneven wear resistance, design efficiency and durability of the blade for molding the sipe were evaluated. The tires having the Miura-ori shaped sipes shown in FIG. 4 were also tested for comparison. Each tire had substantially the same tread pattern except for the shape of sipes. Each sipe had the same amplitude W of 2 mm.

The tires identified in Ex. 11, Ex12 and Ex. 13 had two kinds of sipes that include first three dimensional sipes provided on first blocks corresponding to shoulder blocks and second three dimensional sipes provided on second blocks corresponding to other blocks. Test methods are as follows.

Icy and Snowy Road Performance Test:

The test tires were mounted on wheel rims of 6JJ×15 with an inner pressure of 200 kPa and installed on four wheels of a vehicle (FR car with a displacement of 2,000 cc). A test driver drove the vehicle on a test course having icy and snowy roads, and then the steering stability of each tire was evaluated based on the driver's feeling. The results are shown in Table 1 using an index based on Ref. 1 being 100. The larger the value, the better the performance is.

Dry Road Performance Test:

The test vehicle above was run on dry asphalt road, and then the steering stability of each tire was evaluated based on the driver's feeling. The results are shown in Table 1 using an index based on Ref. 1 being 100. The larger the value, the better the performance is.

Uneven Wear Resistance Test:

Wear energy of each test tire was measured using an indoor wear energy measurement apparatus. The results are shown in Table 1 using an index based on Ref. 1 being 100. The larger the value, the better the performance is.

Blade Durability Test:

The number of tire manufacturable by a blade for molding a sipe was estimated based on its shape and stiffness. The results are shown in Table 1 by an index based on Ref. 1 being 100. The larger the value, the better the performance is.

Design Efficiency Test:

The time required to design only the sipe was measured. The results are shown reciprocal number of the time in Table 1 using an index based on Ref. 1 being 100. The larger the value, the better the performance is.

TABLE 1

|  | Ref. 1 | Ex. 1 | Ex. 2 | Ex. 3 | Ex. 4 | Ref. 2 | Ex. 5 | Ex. 6 | Ex. 7 | Ex. 8 | Ex. 9 | Ex. 10 |
|---|---|---|---|---|---|---|---|---|---|---|---|---|
| 3D sipe spec. | | | | | | | | | | | | |
| Cycle a1 (mm) | 5 | 5 | 5 | 5 | 5 | 5 | 5 | 15 | 5 | 5 | 5 | 2.1 |
| Number of waves in first opening configuration | 3 | 3 | 3 | 3 | 3 | 3 | 3 | 1.1 | 3 | 3 | 3 | 7.1 |
| Cycle a2 (mm) | 5 | 5 | 5 | 5 | 5 | 5 | 15 | 5 | 5 | 5 | 2.1 | 5 |
| Number of waves in second opening configuration | 3 | 3 | 3 | 3 | 3 | 3 | 1.1 | 3 | 3 | 3 | 7.1 | 3 |
| Sipe width 6W (mm) | 0.4 | 0.4 | 0.2 | 1 | 1.2 | 0.4 | 0.4 | 0.4 | 0.3 | 0.4 | 0.4 | 0.4 |
| Angle α (deg.) | 0 | 0 | 0 | 0 | 0 | 50 | 0 | 0 | 20 | 45 | 0 | 0 |
| Sufficiency of Relation (1) | No * | Yes | Yes | Yes | Yes | Yes | Yes | Yes | Yes | Yes | Yes | Yes |
| Icy road performance | 100 | 100 | 98 | 103 | 105 | 90 | 100 | 90 | 98 | 90 | 98 | 105 |
| Snowy road performance | 100 | 100 | 98 | 102 | 103 | 90 | 100 | 90 | 100 | 90 | 98 | 105 |
| Dry road performance | 100 | 100 | 103 | 100 | 95 | 100 | 90 | 100 | 98 | 100 | 100 | 100 |
| Uneven wear resistance | 100 | 100 | 103 | 90 | 80 | 80 | 90 | 105 | 98 | 80 | 100 | 100 |
| Design efficiency | 100 | 1000 | 1000 | 1000 | 1000 | 1000 | 1000 | 1000 | 1000 | 1000 | 1000 | 1000 |
| Blade durability | 100 | 100 | 80 | 105 | 105 | 100 | 100 | 100 | 95 | 100 | 100 | 100 |

TABLE 1-continued

|  | Ex. 11 | Ex. 12 | Ex. 13 |
|---|---|---|---|
| 3D sipe on first blocks | | | |
| Cycle a1 (mm) | 5 | 5 | 5 |
| Number of waves in first opening configuration | 3 | 3 | 3 |
| Cycle a2 (mm) | 5 | 3 | 3 |
| Number of waves in second opening configuration | 2 | 3 | 2 |
| Sipe width 6W (mm) | 0.4 | 0.4 | 0.4 |
| Angle α (deg.) | 0 | 0 | 0 |
| Sufficiency of Relation (1) | Yes | Yes | Yes |
| 3D sipe on second blocks | | | |
| Cycle a1 (mm) | 5 | 5 | 5 |
| Number of waves in first opening configuration | 3 | 3 | 3 |
| Cycle a2 (mm) | 5 | 5 | 5 |
| Number of waves in second opening configuration | 3 | 3 | 3 |
| Sipe width 6W (mm) | 0.4 | 0.4 | 0.4 |
| Angle α (deg.) | 0 | 0 | 0 |
| Sufficiency of Relation (1) | Yes | Yes | Yes |
| Icy road performance | 100 | 100 | 100 |
| Snowy road performance | 100 | 100 | 100 |
| Dry road performance | 110 | 110 | 105 |
| Uneven wear resistance | 110 | 110 | 105 |
| Design efficiency | 1000 | 1000 | 1000 |
| Blade durability | 100 | 100 | 100 |

\* Miura-ori shaped

The invention claimed is:

1. A pneumatic tire comprising
a tread portion having a plurality of blocks comprising a first block and a second block, said first block having a top face provided with a first three-dimensional sipe, said second block having a top face provided with a second three dimensional sipe,
each of said first and second three-dimensional sipes extending along its longitudinal direction having an angle α in a range of from 0 to 45 degrees with respect to an axial direction of the tire,
each of said three dimensional sipes having a first opening configuration that extends in a wavy manner having amplitude W and a cycle a1 in a cross sectional view of said block being parallel to the top face,
each of said first and second three dimensional sipes having a second opening configuration that extends in a wavy manner having amplitude W and a cycle a2 in a cross sectional view of said block being perpendicular to the longitudinal direction, and
each of said first and second three dimensional sipes satisfying the following relation in a rectangular coordinate system of x, y, z axes in which the x-axis corresponds to the longitudinal direction of each sipe, the z-axis corresponds to a depth direction of each sipe, and the y-axis is perpendicular to the x and y axes:

$$y = W \cdot \sin\{(2\pi \cdot x/a1) + (2\pi \cdot z/a2)\},$$

wherein said first block has a maximum axial block width in said blocks and said second block has a minimum axial block width in said blocks,
the first three dimensional sipe of the first block has the cycle a2 larger than the cycle a2 of the second three dimensional sipe of the second block,
the first and second three dimensional sipes differ from each other with respect to the cycle a2, and
the first and second three dimensional sipes have the same cycle a1 and amplitude W.

2. The tire according to claim 1, wherein the cycle a1 of the first opening configuration of each of said first and second three dimensional sipes is in a range of from 14% to 90% of a length BL of said block measured along the x-axis.

3. The tire according to claim 1, wherein the cycle a2 of the second opening configuration of each of said first and second three dimensional sipes is in a range of from 14% to 90% of a height BH of said block measured along the z-axis.

\* \* \* \* \*